United States Patent
Bosshart et al.

(10) Patent No.: US 10,721,167 B1
(45) Date of Patent: Jul. 21, 2020

(54) RUNTIME SHARING OF UNIT MEMORIES BETWEEN MATCH TABLES IN A NETWORK FORWARDING ELEMENT

(71) Applicant: Barefoot Networks, Inc., Santa Clara, CA (US)

(72) Inventors: Patrick W. Bosshart, Plano, TX (US); Michael E. Attig, Sunnyvale, CA (US); Ravindra Sunkad, Pleasanton, CA (US); Jay Evan Scott Peterson, San Francisco, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 4 days.

(21) Appl. No.: 15/986,795

(22) Filed: May 22, 2018

Related U.S. Application Data

(60) Provisional application No. 62/569,641, filed on Oct. 9, 2017.

(51) Int. Cl.
*H04L 12/745* (2013.01)
*H04L 12/743* (2013.01)
*H04L 12/935* (2013.01)
*H04L 12/24* (2006.01)
*H04L 12/911* (2013.01)
*H04L 29/06* (2006.01)

(52) U.S. Cl.
CPC ........ *H04L 45/748* (2013.01); *H04L 41/0816* (2013.01); *H04L 41/0836* (2013.01); *H04L 45/7457* (2013.01); *H04L 47/70* (2013.01); *H04L 49/3063* (2013.01); *H04L 69/22* (2013.01)

(58) Field of Classification Search
CPC ............... H04L 45/748; H04L 41/0816; H04L 41/0836; H04L 45/7457; H04L 47/70; H04L 49/3063; H04L 69/22
USPC .......................................... 370/351, 389, 392
See application file for complete search history.

(56) References Cited

U.S. PATENT DOCUMENTS

| | | | |
|---|---|---|---|
| 7,984,304 B1 | 7/2011 | Waldspurger et al. | |
| 7,990,867 B1 | 8/2011 | Keller et al. | |
| 9,258,224 B2 | 2/2016 | Bosshart et al. | |
| 9,270,586 B2 | 2/2016 | Assarpour | |
| 10,009,276 B2 | 6/2018 | Bosshart et al. | |
| 2010/0042801 A1* | 2/2010 | Lee ........................ | G06F 9/5016 711/171 |

(Continued)

OTHER PUBLICATIONS

Non-Published commonly owned U.S. Appl. No. 15/833,965, filed Dec. 6, 2017, 39 pages, Barefoot Networks, Inc.

*Primary Examiner* — Obaidul Huq
(74) *Attorney, Agent, or Firm* — Compass IP Law PC

(57) ABSTRACT

A method of sharing unit memories between two match tables in a data plane packet processing pipeline of a physical forwarding element is provided. The method, from a plurality of available unit memories of the packet processing pipeline, allocates a first set of unit memories to the first match table and a second set of unit memories to the second match table. The method determines that the first set of unit memories is filled to a threshold capacity after storing a plurality of entries in the first set of unit memories. The method de-allocates a first unit memory from the second match table by moving contents of the first unit memory to a second unit memory in the second set of unit memories. The method allocates the first unit memory to the first match table.

18 Claims, 11 Drawing Sheets

(56) References Cited

U.S. PATENT DOCUMENTS

| | | |
|---|---|---|
| 2014/0086240 A1 | 3/2014 | Assarpour |
| 2014/0241359 A1 | 8/2014 | Bosshart et al. |
| 2015/0358219 A1 | 12/2015 | Kanda et al. |
| 2016/0142315 A1 | 5/2016 | Tomonaga et al. |
| 2016/0216913 A1* | 7/2016 | Bosshart ................ H04L 45/74 |
| 2016/0246507 A1 | 8/2016 | Bosshart |

* cited by examiner

RUNTIME SHARING OF UNIT MEMORIES BETWEEN MATCH TABLES IN A NETWORK FORWARDING ELEMENT

BACKGROUND

Network forwarding elements, such as switches and routers, have control and data plane components. OpenFlow is a networking standard that uses match-action paradigm for network packet switching. OpenFlow forwarding elements use match tables, action tables, statistics memories, meters memories, stateful memories, and ternary indirection memories.

The data plane component of a forwarding element includes several message processing stages that handle the forwarding of data packets that the forwarding element receives. The data plane includes a pool of unit memories in order to allocate memory capacity, to implement various tables and/or logical memories for performing match-action network packet switching.

The control plane component provides an interface for configuring the data plane component. The control plane component includes a compiler that configures the match tables and action tables of the data plane to perform different services provided by the forwarding element. The compiler allocates the match and action tables to different memory units prior to the deployment of the forwarding element. If during the runtime the memory units allocated to one of the tables are filled up, the data plane has to be reconfigured, which causes the current state of the forwarding element to be lost.

SUMMARY

Some embodiments provide a physical forwarding element (e.g., a hardware switch or a hardware router) with a novel packet processing pipeline that dynamically shares unit memory between two match tables during runtime. The forwarding element in some embodiments includes an ingress pipeline and an egress pipeline. Each one of the ingress and egress pipelines includes a match-action unit (MAU) that includes a set of match-action stages. Each of these stages matches a particular set of header fields of the packet coming into the pipeline against a match table, and takes an action based on the result of the match.

Some embodiments provide a method for sharing unit memories between two match tables in the data plane packet processing pipeline of a physical forwarding element. The method specifies a current number of unit memories, a maximum number of allowed unit memories, and a unit memory increment size for each match table.

The method initially allocates a first set of unit memories to a first match table and a second set of unit memories to a second match table, as the current set of unit memories for the two tables. The packet processing pipeline in some embodiments has a pool of available unit memories to allocate to the two match tables. For instance, in some embodiments the unit memories are organized in rows and columns, and the pool of available memories for each pair of match tables belong to one of the rows (or one of the columns) that share the same set of routing resources, such as search and payload buses. In other embodiments, every unit memory in the packet processing pipeline share the same set of search and payload buses and can be included in the pool of available unit memories for a pair of match tables.

Some embodiments provide two search busses and two payload busses to each unit memory in the pool of unit memories. The search buses are used to provide search keys for searching a match table. The payload buses are used to provide data to perform actions resulting from match table lookups (e.g., to write into a match table). In some embodiments, the unit memories allocated to the first match table use one of the search buses and one of the payload buses and unit memories allocated to the second match table use the other search and payload buses.

As packets for new flows arrive to the packet processing pipeline, new entries are inserted into the match tables. Eventually the number of entries in one of the match tables, for instance the first match table, reaches or exceeds a certain threshold. The threshold capacity may be any value equal to or less than 100%. The method then determines whether the current number of unit memories allocated to the first match table is less than the maximum number of allowed unit memories for the first match table. If so, the method allocates one or more unit memories to the match table based on the unit memory increment size of the first match table.

Otherwise, when the current number of unit memories allocated to the first match table has reached the maximum number of allowed unit memories, the method de-allocates a unit memory from the second match table, increases the maximum number of allowed unit memories of the first match table, and allocates the unit memory to the first match table.

The de-allocation of the unit memory from the second match table is performed by moving the entries of the unit memory to another unit memory that is currently allocated to the second match table. Each entry in a match table in some embodiments points to an entry in a corresponding action table. In some embodiments, the match entry specifies the address of the action entry within its data. In these embodiments, when a match entry is moved from one unit memory to another, the address of the action entry within the match entry data would still point to the correct action table entry.

In other embodiments, however, the match entries do not specify the address of the corresponding action entry, but instead use a direct addressing scheme in which the address of the match entry is used for the address of the action entry. That is, a match entry located at location X of a unit match memory automatically references the action entry located at location X of the corresponding unit action memory. When a match entry is moved from location X in a first unit memory to a location Y in a second unit memory, the corresponding action entry shall also be moved to the location Y in the action unit memory. Some embodiments utilize a set of move register operations to move an action entry from one location to another location in the same or in a different unit action memory in a pool of unit action memories.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for sharing unit memories between two match tables in the data plane packet processing pipeline of a physical forwarding element. The method specifies a current number of unit memories, a maximum number of allowed unit memories, and a unit memory increment size for each match table. The method initially allocates a first set of unit memories to a first match table and a second set of unit memories to a second match table, as the current set of unit memories for the two tables.

As packets for new flows arrive to the packet processing pipeline, new entries are inserted into the match tables. Eventually the number of entries in one of the match tables, for instance the first match table, reaches or exceeds a certain threshold. The threshold capacity may be any value equal to or less than one hundred percent.

The method then determines whether the current number of unit memories allocated to the first match table is less than the maximum number of allowed unit memories for the first match table. If the current number of unit memories is less than the maximum number, the method allocates one or more unit memories to the match table based on the unit memory increment size of the first match table. Otherwise, the method de-allocates a unit memory from the second match table, increases the maximum number of allowed unit memories of the first match table, and allocates the unit memory to the first match table. Several more detailed embodiments are described below.

I. The Forwarding Element

As used in this document, data messages or packets refer to a collection of bits in a particular format sent across a network. It should be understood that the terms data message or packet may be used herein to refer to various formatted collections of bits that may be sent across a network, such as Ethernet frames, IP (Internet protocol) packets, TCP (transmission control protocol) segments, UDP (user datagram protocol) datagrams, etc.

Some embodiments provide a method of sharing unit memories between two match tables in the data plane packet processing pipeline of a physical forwarding element. The forwarding element has control and data plane components. The control plane component provides an interface for configuring the data plane component. The data plane components receive configurations from the control plane and process packets received by the forwarding element.

Figure 1:
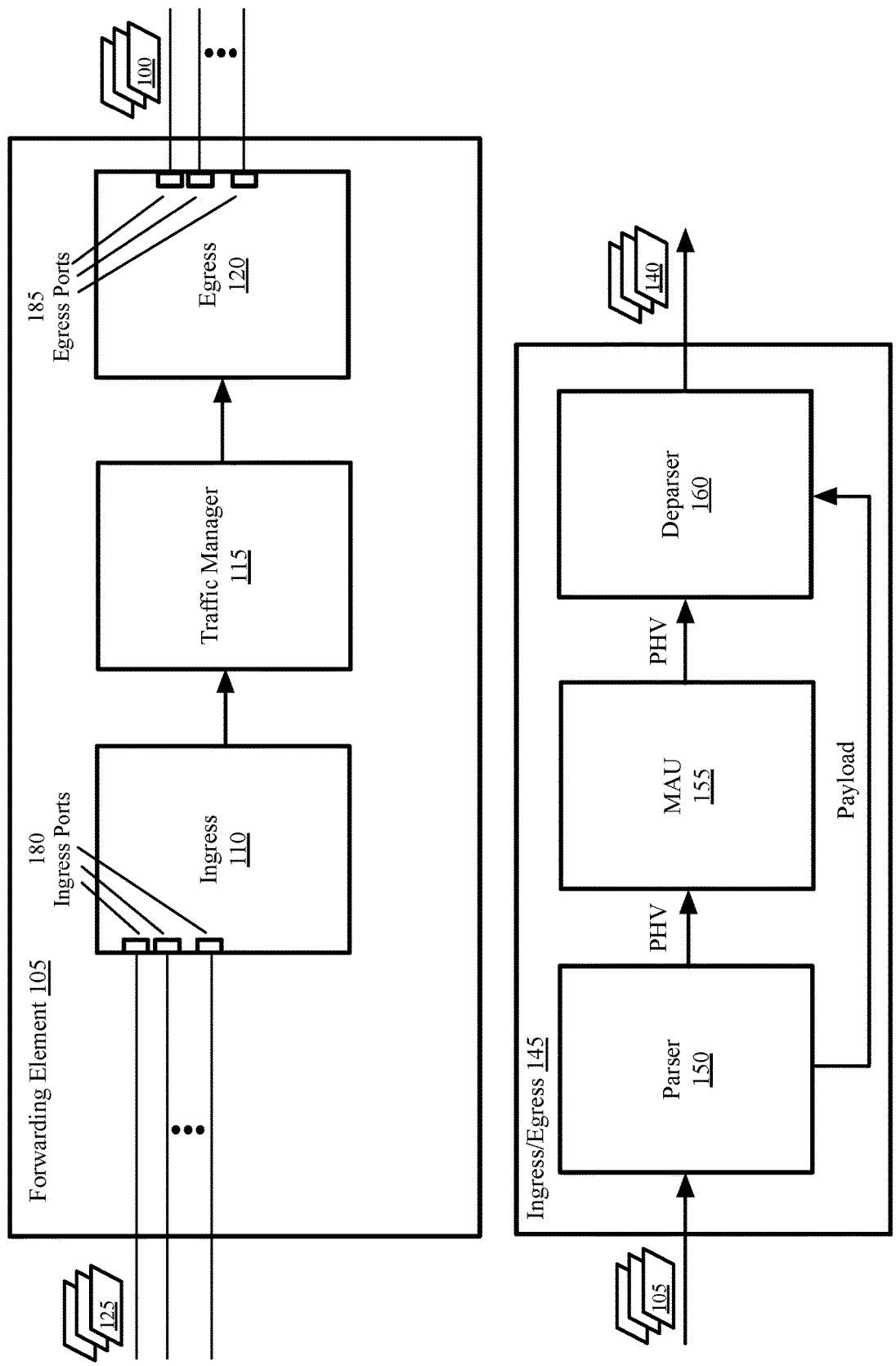
FIG. 1 conceptually illustrates a block diagram of a hardware forwarding element in some embodiments.

FIG. 1 conceptually illustrates a block diagram of a hardware forwarding element in some embodiments. As shown, the forwarding element 105 includes an ingress pipeline (or data path) 110, a traffic manager 115, and an egress pipeline 120. FIG. 1 also shows a block diagram 145 of an interface of the hardware forwarding element 105. Each one of the ingress 110 and egress 120 pipelines uses an interface similar to the interface 145. The interface includes a pipeline with three different units, namely a parser unit 150, a match action unit (MAU) 155, and a deparser unit 160.

The traffic manager 115 in some embodiments receives the packets that are processed by the ingress pipeline and provides a large shared buffer (storage) that accommodates the queuing delays due to oversubscription of the output channels of the ingress deparser. In some embodiments, the data buffer stores packet data, while pointers to that data are kept in different queues per channel. Each channel in turn requests data from the common data buffer using a configurable queuing policy. When pointers to packets reach the head of the queues, the packets are read out of the data buffer of the traffic manager 115 into the egress pipeline 120.

As shown, the ingress packets 125 are received at the ingress pipeline 110 through a set of ingress ports 180. The parser 150 of some embodiments receives the incoming packets and produces a packet header vector (PHV) as its output. In other words, the parser 150 separates the packet headers from the packet payload by extracting different fields of packet headers and storing them in the PHV.

In some embodiments, the PHV includes a set of different-sized registers or containers. For instance, in some embodiments the PHV includes sixty-four 8-bit registers, ninety-six 16-bit registers, and sixty-four 32-bit registers (for a total of 224 registers containing 4096 bits). Other embodiments may have any different numbers of registers of different sizes. In some embodiments, the parser 150 stores each extracted packet header in a particular subset of one or more registers of the PHV. For example, the parser might store a first header field in one 16-bit register and a second header field in a combination of an 8-bit register and a 32-bit register (e.g., if the header field is 36 bits long).

The PHV produced by the parser provides the input data to the match tables of the MAU. In some embodiments, the MAU 155 includes a set of match-action stages (e.g., 32 match-action stages). Each of these stages matches a particular set of header fields of a packet against a match table, and takes an action based on the result of the match (e.g., assigning the packet to an output port and queue, dropping the packet, modifying one or more of the header fields, etc.). Based on the actions taken on different header data during the different stages of the MAU 155, the PHV that the MAU outputs to deparser 160 may either include the same or contain different header data as the PHV that the MAU received from the parser 150.

The output PHV is handed by the MAU 155 to the deparser 160. The deparser 160 reassembles the packet by putting back together the output PHV (that might or might not have been modified) that the deparser receives from the MAU 155 and the payload of the packet that the deparser receives directly from the parser 150.

The deparser then sends the packets 140 out of the ingress/egress pipeline through a set of egress ports 185 (to the traffic manager 115 or out of the forwarding element, depending on whether it is the deparser for the ingress pipeline or the egress pipeline). An output packet 100 may be the same packet as the corresponding input packet 125 (i.e., with identical packet headers), or it may have different packet headers compared to the input packet based on the actions that are applied to the packet headers in the ingress and egress pipelines (e.g., different header field values for certain header fields and/or different sets of header fields).

It should be understood that the illustrated blocks in forwarding element 105 are exemplary only. The ingress, traffic manager, and egress blocks are simplified for ease of description. For example, although the figure shows only one entry point to the ingress parser and one exit point from the egress de-parser, in some embodiments the input signals are received by many different input channels (e.g., 64 channels) and the output signals are sent out of the forwarding element from different output channels (e.g., 64 channels). Additionally, although for the illustrated forwarding element only one parser interface is shown for the ingress/egress pipeline 145, some embodiments employ numerous parser blocks (e.g., 16 parser blocks) that feed a match-action unit (MAU) in each pipeline.

A match table in some embodiments is used as a hash-addressed table (or hash table). A set of one or more hash functions (depending on the particular hashing scheme) are used to access the match table. A typical search key to the hash table is an n-tuple (e.g., the network Layer 3 (L3) source and destination addresses, the network Layer 4 (L4) source and destination ports, and the protocol used) in the header of a data message that is processed by the data plane pipeline.

A hash of the search key calculated by a hash function results in an index into the hash table. An examination of the table location pointed by the calculated index (and possibly one or more locations in case more than one keys are mapped to the same location) results in either (i) identification of a value stored in the hash table that corresponds to the search key, or (ii) a determination that the hash table does not store a value that corresponds to the search key. When the hash table is a data plane match table, the value found in the hash table is, by itself, a key that identifies a corresponding location in an action table to perform an action on the data message that is processed by the data plane pipeline.

A. Packet Forwarding Architecture

The forwarding element (e.g., a switch, router, or combination thereof) of some embodiments uses the OpenFlow protocol. The network packets in some embodiments are routed to, processed by, and routed from the forwarding element according to one or more match-action tables (also referred to as flow tables) that are a part of the flow table architecture of the forwarding element. The flow tables include flow entries with (i) match conditions that are compared to the headers of the packets, and (ii) actions to take if a packet meets the corresponding match conditions. The flow table architecture includes various memories (e.g., unit SRAMs, TCAMs, etc.) that store the flow table data, as well as arithmetic logic units (e.g., ALUs), and other supporting circuitry.

Figure 2:
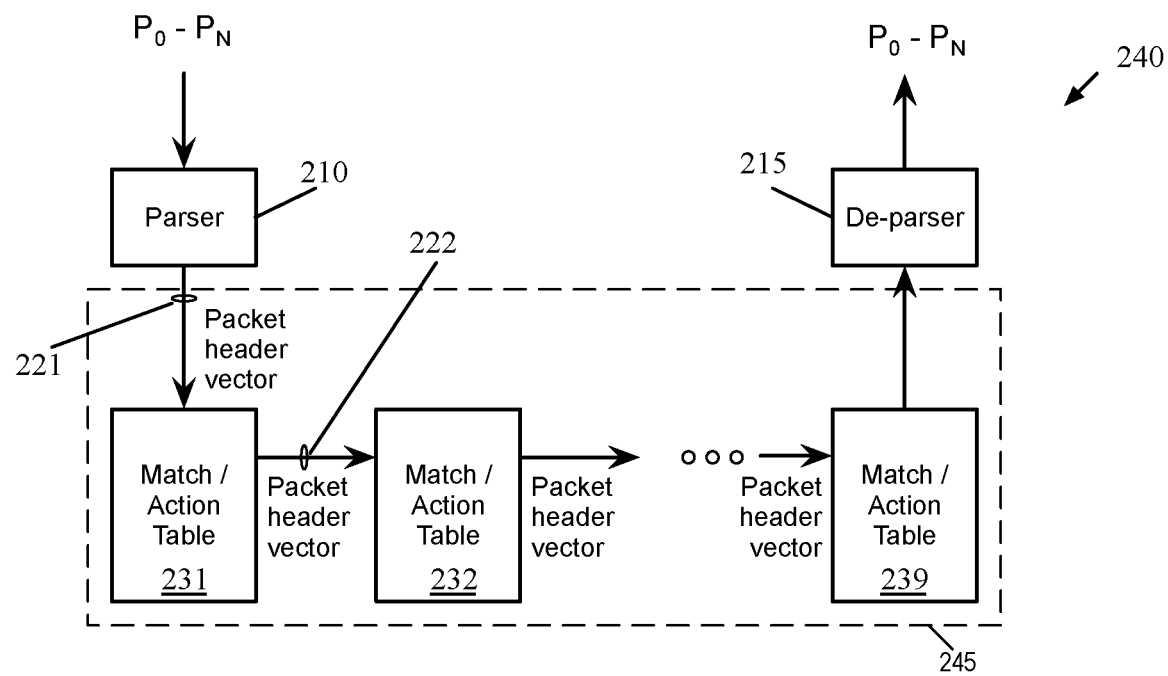
FIG. 2 conceptually illustrates the flow table architecture of a forwarding element of some embodiments.

FIG. 2 conceptually illustrates the flow table architecture 245 of a forwarding element 240 of some embodiments. The forwarding element includes a number of ports $P_0$-$P_N$. Each of the ports $P_0$-$P_N$ connects to a parser 210, which parses the packet headers to create an initial packet header vector 221. In some embodiments, the parser 210 identifies the fields at specific locations in the packet and aligns the packet header data in a format that allows the arithmetic logic units of the forwarding element hardware to identify the different header fields.

The forwarding element 240 then submits the packet header vector 221 to a successive sequence of match-action tables 231-239, which are implemented by the forwarding element (e.g., by a set of ALUs and SRAMs, or other hardware constructs). In some embodiments, the packet header vector 221 is submitted to the first match-action table 231 to determine whether a matching entry can be found in the table. If so, the forwarding element 240 applies the corresponding actions to the packet, which may involve manipulating the data of the packet header vector (e.g., modifying media access control (MAC) addresses, adding or removing virtual local area network (VLAN) tags or multiprotocol label switching (MPLS) labels, decrementing the packet time-to-live (TTL), etc.), specifying to which of several possible second match-action tables the packet should be submitted, outputting the packet to a particular port, dropping the packet, etc. The forwarding element then submits a subsequent packet header vector 222 to the next match-action table 232, which operates in the same manner as the first table 231. This subsequent packet header vector 222 may be the same as the first packet header vector 221, or may include one or more modified values based on the actions specified by the identified action from the first match-action table 231.

Different embodiments implement match-action table stages of the forwarding element 240 differently. In some embodiments, selected modifications are postponed until after all match stages are executed. In some embodiments, a flow entry match specifies the address of the next table to be executed as a forward-only branch. Eventually, after all tables are consulted in this manner, the fields are presented to a deparser 215, which realigns the fields into a packet, which is then output to the appropriate one of ports $P_0$ through $P_N$.

A match table in some embodiments is used as a hash-addressed table (or hash table). A set of one or more hash functions (depending on the particular hashing scheme) are used to access the match table. A typical search key to the hash table is an n-tuple (e.g., the network Layer 3 (L3) source and destination addresses, the network Layer 4 (L4)

source and destination ports, and the protocol used) in the header of a data message that is processed by the data plane pipeline.

A hash of the search key calculated by a hash function results in an index into the hash table. An examination of the table location pointed by the calculated index (and possibly one or more locations in case more than one keys are mapped to the same location) results in either (i) identification of a value stored in the hash table that corresponds to the search key, or (ii) a determination that the hash table does not store a value that corresponds to the search key. When the hash table is a data plane match table, the value found in the hash table is, by itself, a key that identifies a corresponding location in an action table to perform an action on the data message that is processed by the data plane pipeline.

An example of a hashing scheme is cuckoo hashing. In this scheme, a set of two or more different hash functions are used to calculate hash values for a search key. For a cuckoo hash that uses n different hash functions, n possible locations (or cells) are identified for the key. Each hash function uses a portion of the hash table's address space. Each portion (or sub-table) is referred to as a way, which is the portion of the hash table where the entries for one of the multiple hash functions are kept. For instance, when a cuckoo hashing scheme uses n hash functions, the hash table is divided into n sub-tables or ways. Each hash function stores its entries in the corresponding way during an insertion operation (where a new entry is inserted in the hash table), and provides an index into the corresponding sub-table during a search operation (when a search is made to find an entry corresponding to a search key).

Insertion of entries into a cuckoo hash table is done by calculating the hash value for a key by each of the n hash functions. When the cell identified by one of the hash function is empty, the hash value is inserted in the cell identified by that hash function in the corresponding way. When all cells identified by the n hash functions are already full, the new hash value is entered into the hash table by inserting the hash value in one of the n possible locations and moving out the hash value that already reside in that location (similar to a cuckoo bird chick that pushes the other eggs out of a nest). This displaced hash value is then inserted in an alternative location by moving out any hash value that might reside there. These steps continue until an empty location is found to insert the last displaced hash value. Although the invention is described by referring to several examples of cuckoo hash, it should be understood that the invention is applicable to other hash schemes that uses multiple hash functions and multiple ways.

B. Unit Memories

Figure 3:
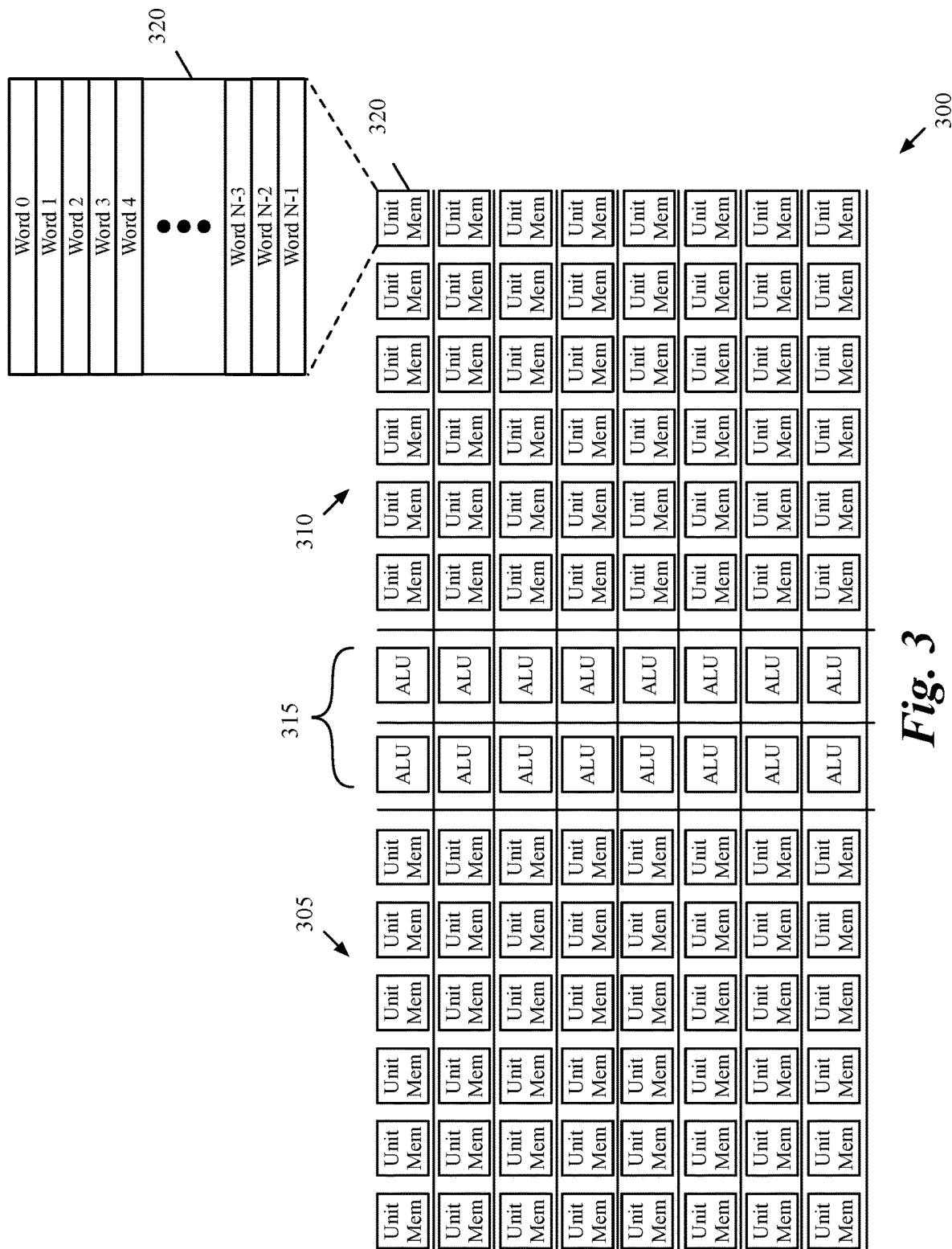
FIG. 3 conceptually illustrates a grid of unit memories in some embodiments.

As mentioned above, the match-action tables of some embodiments are implemented using memory structures of the forwarding element. For example, some embodiments use pools of unit memories (e.g., SRAMs, TCAMs, etc.) to implement one or more match-action stages. In some embodiments, the unit memories are arranged in a grid of rows and columns. FIG. 3 conceptually illustrates such a grid 300 of unit memories in some embodiments. Specifically, this example shows 96-unit memories arranged in 16 logical rows, with each row associated with an ALU 315. The 16 logical rows are divided into two separate grids 305 and 310 of eight rows, having six columns in each of the two separate grids. It should be understood that the arrangement of memories shown in FIG. 3 is only one of many examples of the possible arrangements of unit memories to implement match-action tables in a forwarding element, and that the inventive concepts described herein are applicable to many such arrangements.

In some embodiments, each of these unit memories has a number of memory locations, or "words" that can be read by the ALUs. As shown for one of the unit memories 320, each memory includes N locations, from Word 0 to Word N−1. In some embodiments, each location has a fixed width based on the specific unit memories used in the grid 300, such as 64 bits, 128 bits, 256 bits, etc. The ALUs 315 in some embodiments read one memory location per unit memory in a given clock cycle. In some embodiments, separate sets of ALUs may be dedicated to perform packet modification operations, or to perform packet state-related operations, such as statistics (counting), metering, etc. Some embodiments locate the state-related ALUs in the center of the grid of unit memories (as shown in FIG. 3), while locating the packet modification ALUs elsewhere in the hardware.

Each of the unit memories (also referred to as unit RAMs) may be used to store different entries. For instance, a first unit memory might store match entries, while a second unit memory stores the action entries that correspond to the match entries of the first unit memory. In addition, the unit memories may store other data for a match-action based forwarding element, including meters (used to measure data flow rates), statistics (e.g., counters for counting packets, bytes, etc.), ternary indirection (TIND), etc. Since a TCAM search results in an address (instead of data), some embodiments program one or more unit RAMs as a TIND storage to store data associated with a TCAM address.

The packet processing pipeline in some embodiments has a pool of available unit memories to share by two match tables. The unit memories in the pool share the same set of resources.

For instance, in some embodiments the unit memories share the same set of routing resources such as search and payload buses. Depending on the particular implementation, the pool of available memories for each pair of match tables may be part of the memory grid 300 or belong to one of the columns of the grid. In other embodiments, every unit memory in the packet processing pipeline share the same set of search and payload buses, and can be included in the pool of available unit memories for a pair of match tables.

Some embodiments provide two search buses and two payload buses to each unit memory in the pool of unit memories that is shared by a pair of match tables. The search buses are used to provide search keys for searching a match table. The payload buses are used to provide data to write into a match table. In some embodiments, the unit memories allocated to the first match table use one of the search buses and one of the payload buses, and unit memories allocated to the second match table use the other search and payload buses.

II. Runtime Re-Allocation of Unit Memories Between Two Match Tables

A forwarding element in some embodiments includes a control plane component and a data plane component. The control plane component provides an interface for configuring the data plane component. The data plane includes a pool of unit memories to allocate memory capacity, to implement various tables and/or logical memories for performing match-action network packet switching.

In some embodiments, the control plane is implemented by a control software layer that is executed by one or more general purpose processors (e.g., CPUs (central processing units)) of the forwarding element, while the data plane pipeline is implemented by forwarding circuits that are custom built (e.g., application specific integrated circuits (ASICs) or other type of integrated circuit chips) for performing forwarding operations at very fast line rates.

The control plane component in some embodiments includes a compiler that configures the match tables and action tables of the data plane for performing different services provided by the forwarding element. The compiler in some embodiments allocates an initial set of unit memories to the match and action tables prior to the deployment of the forwarding element.

Figure 4A:
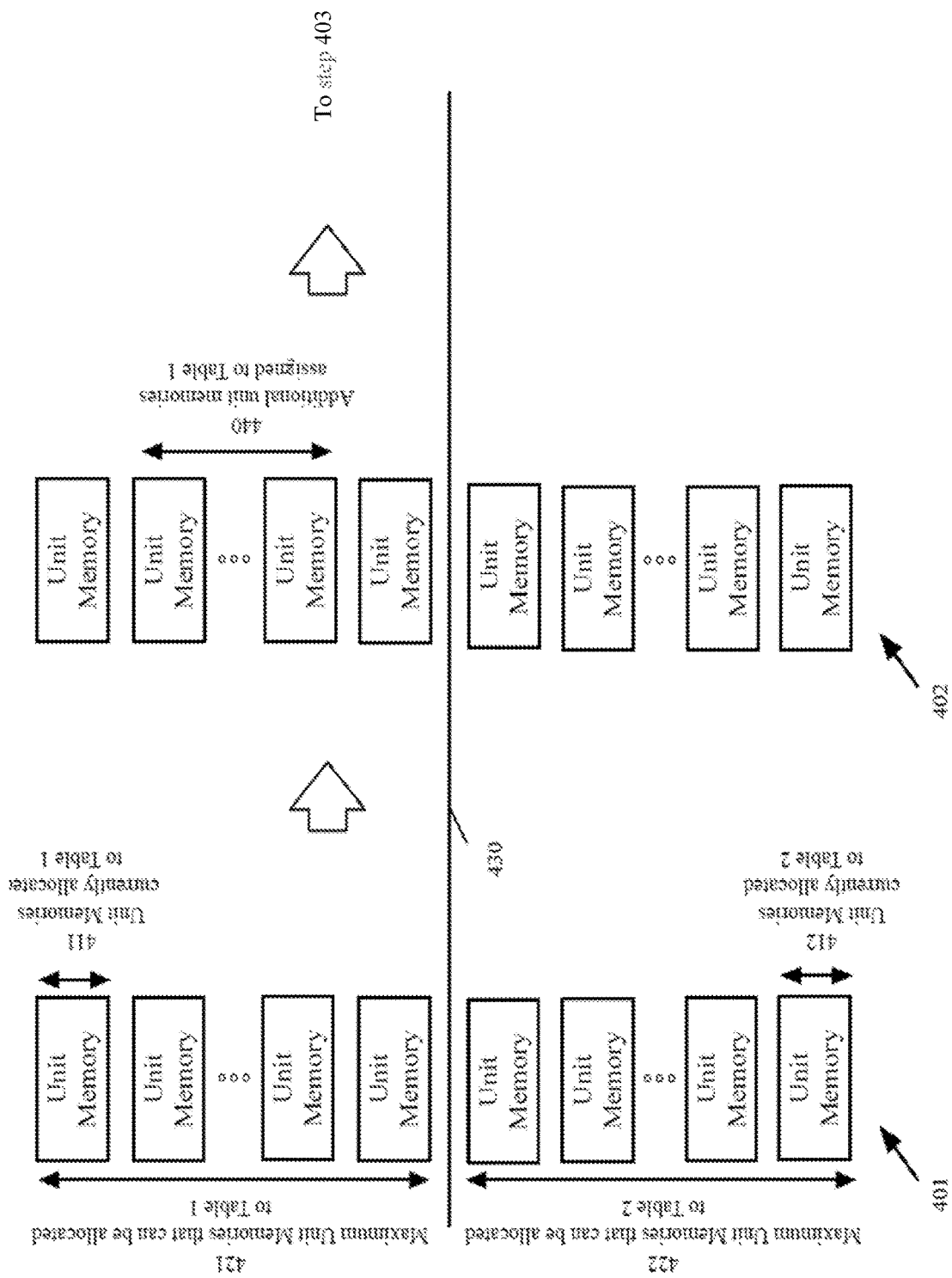
FIGS. 4A-4B conceptually illustrate a pair of match tables that share a pool of unit memories in some embodiments.
Figure 4B:
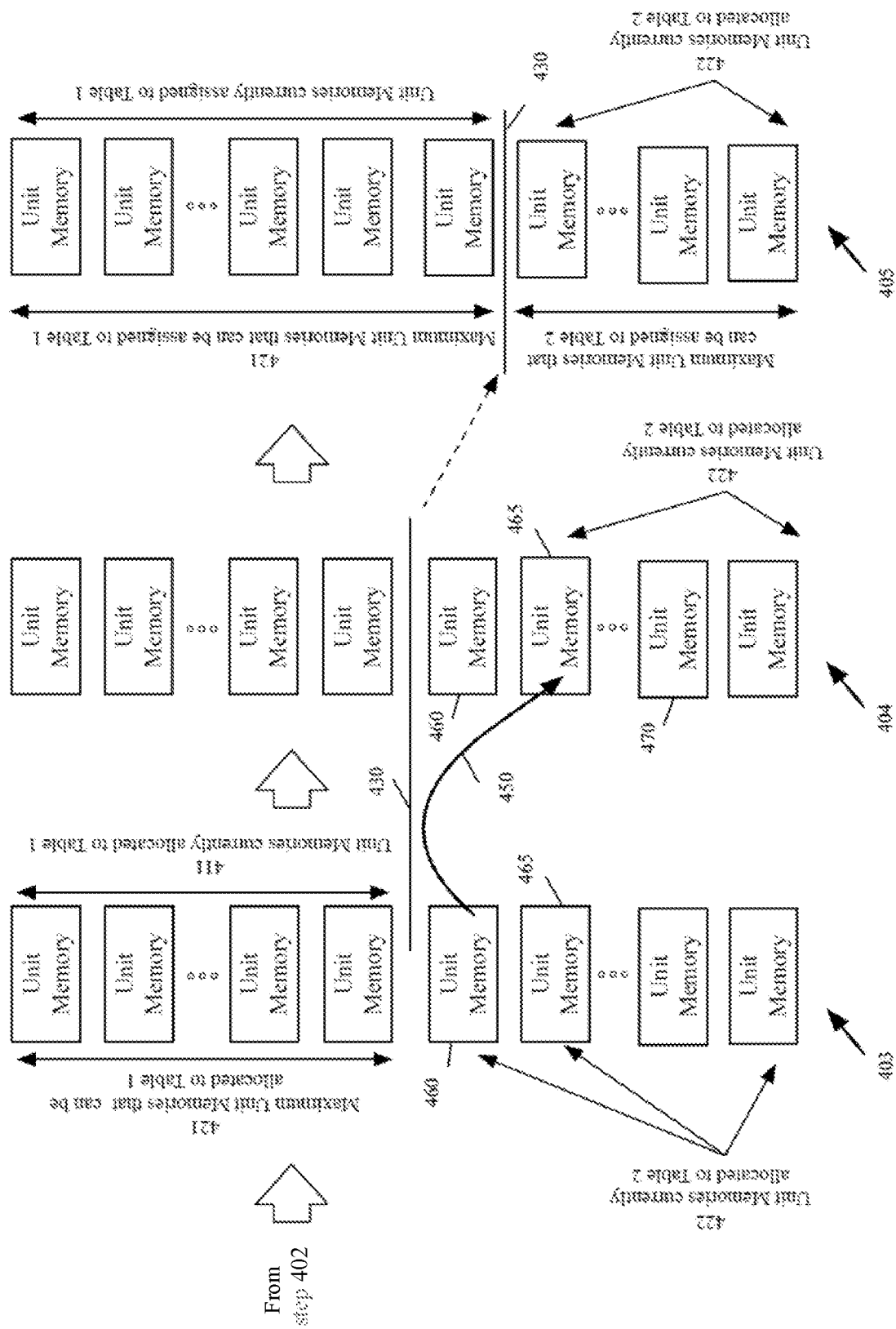

Some embodiments configure pairs of match tables and allow the two match tables in each pair to share a set of unit memories. Each match table in a pair is initially configured to have an initial number of unit memories. Also, for each table, a maximum number of allowed unit memories, a unit memory increment size, and a threshold capacity is specified. FIGS. 4A-4B conceptually illustrate a pair of match tables that share a pool of unit memories in some embodiments. The figures are shown in five steps 401-405. As shown in step 401, the first match table is initially allocated a set of unit memories 411. The second match table is also initially allocated a set of unit memories 412.

Although the initial set of allocated unit memories to each match table in the example of FIG. 4A is one, it should be understood that any number of unit memories that is less than or equal to the maximum number of allowed unit memories can be assigned to a match table. The figure also shows the maximum number of allowed unit memories 421 for the first match table and the maximum number of allowed unit memories 422 for the second match table. The line 430 conceptually divides the unit memories that can initially be used by each match table.

As packets for new flows arrive to the packet processing pipeline, new entries are inserted into the match tables. Eventually the number of entries in one of the match tables, for instance the first match table, reaches or exceeds a certain threshold. The threshold capacity may be any value equal to or less than 100%. In step 401, the current number of unit memories 411 allocated to the first match table is less than the maximum number of allowed unit memories 421 for the first match table.

As shown in step 402, a set of additional unit memories 440 is allocated to match table 1. The number of additional unit memories depends on the unit memory increment size specified for match table 1 (e.g., 1, 2, etc.). As shown in step 403, the current number of unit memories 411 allocated to the first match table reaches the maximum number of allowed unit memories 421 for the table. Eventually the number of entries in the first match tables reaches or exceeds the threshold (e.g., 100%, 90%, 80%, etc.).

At this point, the maximum number of allowed unit memories is already allocated to the first match table. Therefore, one of the unit memories that are allocated to the second match table, e.g., unit memory 460, is de-allocated from the second match table and allocated to the first match table.

In order to de-allocate a unit memory from a match table, the entries are moved to another unit memory. In the illustrated example, the entries in unit memory 460 are moved (as shown by 450) to another unit memory 465 that is already allocated to the second match table. This example assumes that unit memory 465 has enough empty space to include the entries from unit memory 460.

In a scenario where none of the unit memories already allocated to the second match table have enough room, a new unit memory such as unit memory 470 can be allocated to the second match table as long as the second match table has not exceeded its maximum allowed number of unit memory. In yet another scenario, the contents of unit memory 460 can simply be erased if the contents of the second match table are no longer needed.

An example of the benefit of dynamically sharing unit memories between two match tables is where the data plane processing pipeline is initially configured such that one of the match tables, for example the first match table, is initially configured to include hash values for flows that use Internet protocol version 6 (IPv6) addresses, and the second match table is initially configured to include hash values for the flows that use Internet protocol version 4 (IPv4) addresses.

The chip is then incorporated in a forwarding element such as a router or switch by an original equipment manufacturer (OEM), and sold to and/or deployed to a client cite. If the particular client only uses flows for IPv6, only uses flows for IPv4, or uses either IPv4 or IPv6 for many more flows, then the unit memories allocated to one of the two match tables will not be used or will be filled much slower than the unit memories for the other match table in the pair. Also, a client may over a period of many years switch from one type of flow (e.g., IPv4) to another type of flows (e.g., IPv6). In this case, some or all the unit memories allocated to the match table that was used for IPv4 can be de-allocated and allocated to the match table that uses IPv6.

In step 404, unit memory 460 is emptied and de-allocated (as shown by 422). In step 405, the maximum number of allowed unit memories 421 for first match table is increased (e.g. incremented by 1) and the maximum number of allowed unit memories 422 for the second match table is decreased (e.g. decremented by 1). The changes in the maximum number of allowed unit memories for the two tables is shown by the change in the conceptual line 430 that shows the utilization of the unit memories by each match table. In a scenario where more than one unit memories are de-allocated at once from the second match table and allocated to the first match table (e.g., when the unit memory increment size for the first match table is more than one), the maximum number of allowed unit memories are adjusted accordingly.

Figure 5:
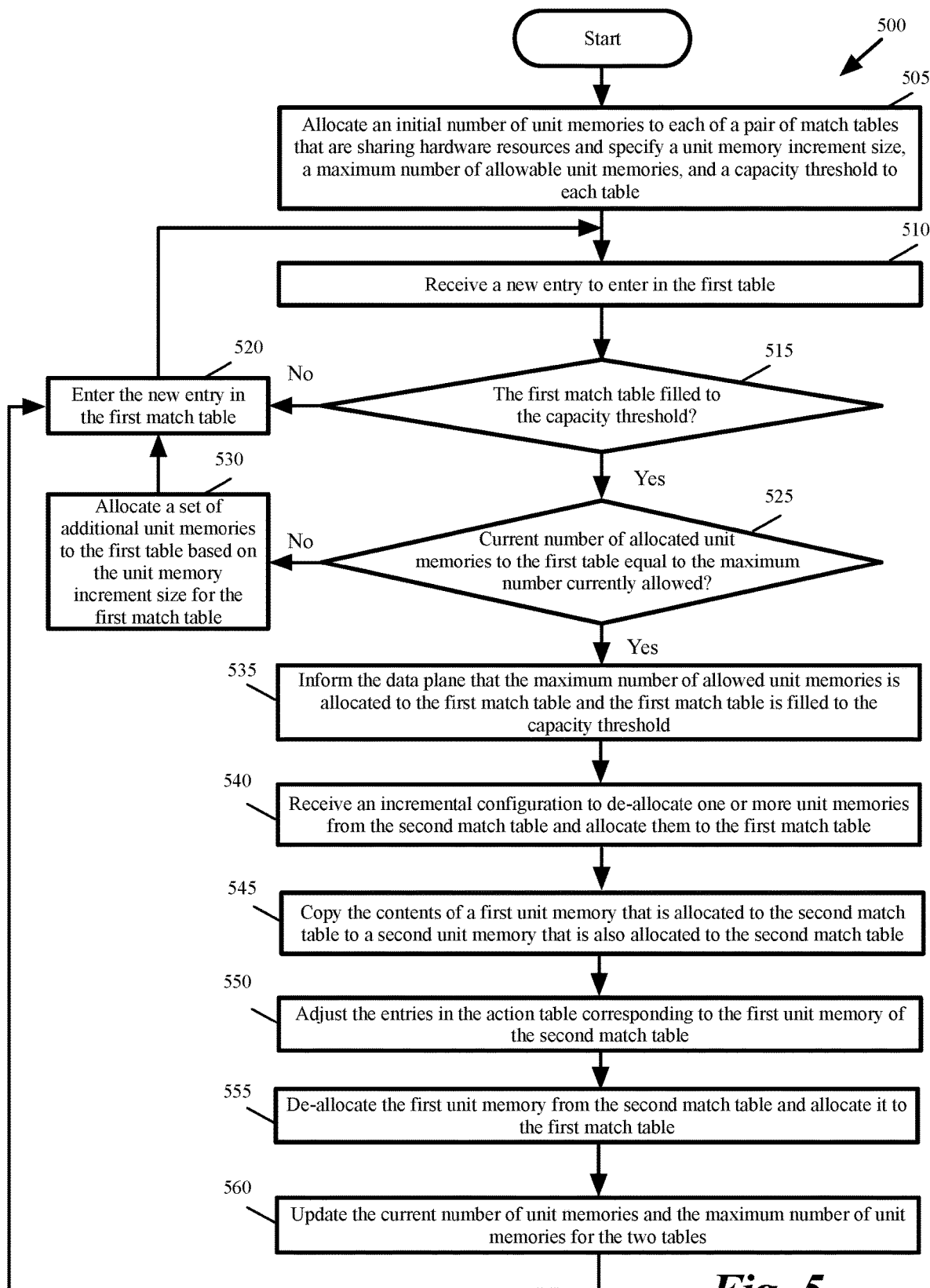
FIG. 5 conceptually illustrates a process for allocating additional unit memories to a match table during the runtime of a data plane packet processing pipeline in some embodiments.

FIG. 5 conceptually illustrates a process 500 for allocating additional unit memories to a match table during the runtime of a data plane packet processing pipeline in some embodiments. The process in some embodiments is performed by the data plane of a forwarding element. The process is described for a scenario where the first match table is filled to the capacity threshold before the second match table. It should be understood that the process is also applicable to the scenario where the second match table is filled first.

As shown, the process allocates (at 505) an initial number of unit memories to each of a pair of match tables that are sharing hardware resources, and specifies a unit memory increment size and a maximum number of allowable unit memories for each of the two tables. The process then receives (at 510) a new entry to enter in the first match table. For instance the data plane processing pipeline receives a packet with a new flow with IPv6 address.

The process then determines (at 515) whether the first match table is filled to the capacity threshold. For instance, the process determines whether the first match table is filled to the capacity threshold, as described above by reference to step 403 in FIG. 4B. If not, the process enters (at 520) the new entry in the first match table. The process then proceeds to 510, which was described above.

Otherwise, the process determines (at 525) whether the current number of unit memories allocated to the first match table equals the maximum number of unit memories that are currently allowed for the first match table. For instance, the process determines whether the number of unit memories that are allocated to the first match table (as shown by 411 in step 403 in FIG. 4B) is equal to the maximum number of unit memories currently allowed for the first match table (as shown by 411 in step 403 in FIG. 4B). In some embodiments, there is an absolute maximum number of unit memories that are allowed for a match table. However, the maximum number of unit memories that are currently allowed for a match table may be less than this absolute maximum number. The maximum number of unit memories that are currently allowed for a match table, may therefore be increased as long as the current maximum number does not exceed the absolute maximum number.

If the number of unit memories allocated to the first match table is not equal to the maximum number of unit memories that are currently allowed for the first match table, the process allocates (at 530) a set of additional unit memories to the first match table based on the unit memory increment size for the first match table. For instance, the process allocates a set of unit memories 440 to the first match table as described above by reference to step 402 in FIG. 4A. The process then proceeds to 530, which was described above.

Otherwise, when the current number of unit memories that are allocated to the first match table is equal to the maximum number of unit memories currently allowed for the first match table, the process informs (at 535) the data plane that the maximum number of allowed unit memories are allocated to the first match table and the match table is filled to the capacity threshold. The process then receives (at 540) an incremental configuration from the control plane to de-allocate one or more unit memories from the second match table and allocate them to the first match table. It should be understood that the incremental configuration is received as long as the number of the unit memories allocated to the first match table does not exceed the absolute maximum number of unit memories allowed for the first match table.

An incremental configuration in some embodiments is loaded from the control plane into the data plane without destroying the state of the data plane. In other words, the incremental configuration is loaded in the data plane processing pipeline chip without destroying the contents of match and action tables, the statistic and meters collected by the data plane, the contents of ALUs, etc. The incremental configuration in some embodiments is loaded from the control plane into the data plane using direct memory access (DMA). For instance, the forwarding element processor uses software to program a set of DMA descriptors while the packet processing stages of the data plane are processing the incoming packets traffic. The processor also loads the configuration data into the DMA buffers while the packet processing stages of the data plane are processing the incoming packets traffic.

Once the DMA buffers are loaded, the processor sends a command to the data plane to halt the incoming traffic to the packet processing stages of the data plane. For instance, the control plane sends a DMA instruction to the parsing circuits of the ingress pipeline to stop receiving incoming packets and/or to pause the delivery of the incoming packets to the processing stages. The DMA instruction in some embodiments is programmed into a DMA descriptor, which is the first descriptor that is used to start the DMA transfer.

The process then copies (at 545) the contents of a first unit memory that is allocated to the second match table to a second unit memory that is also allocated to the second match table. For instance, the process copies the entries from unit memory 460 to unit memory 465 as described above by reference to steps 403 and 404 in FIG. 4B. The process also adjusts (at 550) the entries in the action table that corresponds to the first unit memory of the second match table if necessary. In some embodiments, the process also adjusts entries in the unit memories allocated to other types of tables that may be associated with (or attached to) a match table. For instance the process may also adjust the unit memory entries allocated to statistics tables, meter tables, tables with stateful entries, TIND table, and/or selector tables that are associated with a match table.

Each entry in a match table matches a particular set of header fields of a packet that comes into the data plane packet processing pipeline against an action table and identifies an action entry in an action table for taking an action on the packet. Each entry in a match table in some embodiments points to an entry in a corresponding action table. In some embodiments, the match entry specifies the address of the action entry within its data. In these embodiments, when a match entry is moved from one unit memory to another, the address of the action entry within the match entry data still points to the correct action table entry. Similarly, when a match entry is moved from one unit memory to another, the address of the associated statistics, meter, stateful, TIND, and/or stateful entries within the match entry data still points to the correct statistics, meter, stateful, TIND, and/or stateful entries.

In other embodiments, however, the match entries do not specify the address of the corresponding action entry, but instead use a direct addressing scheme in which the address of the match entry is used for the address of the action entry. That is, a match entry located at a particular location of a unit match memory automatically references the action entry located at the same location of the corresponding unit action memory. In these embodiments, once a match table entry is moved in a match table, the corresponding action table entry also moves in the action table. Details of updating the action table entries are described in Section III, below.

The process then de-allocates (at 555) the first unit memory from the second match table and allocates it to the first match table. As described above, some embodiments provide two search buses and two payload buses to each unit memory. In some embodiments, the unit memories allocated to the first match table use one of the search buses and one of the payload buses, while the unit memories allocated to the second match table use the other search bus and the other payload bus. When the first unit memory is de-allocated from the second match table and is allocated to the first match table, the search and payload buses used by the unit memory are also changed from the search and payload buses used by the second match table's unit memories to the search and payload buses used by the first match table's unit memories.

The process then updates (at 560) the current number of unit memories allocated and the maximum allowed number of unit memories for the first and second match tables. The process then proceeds to 520, which was described above.

Figure 6:
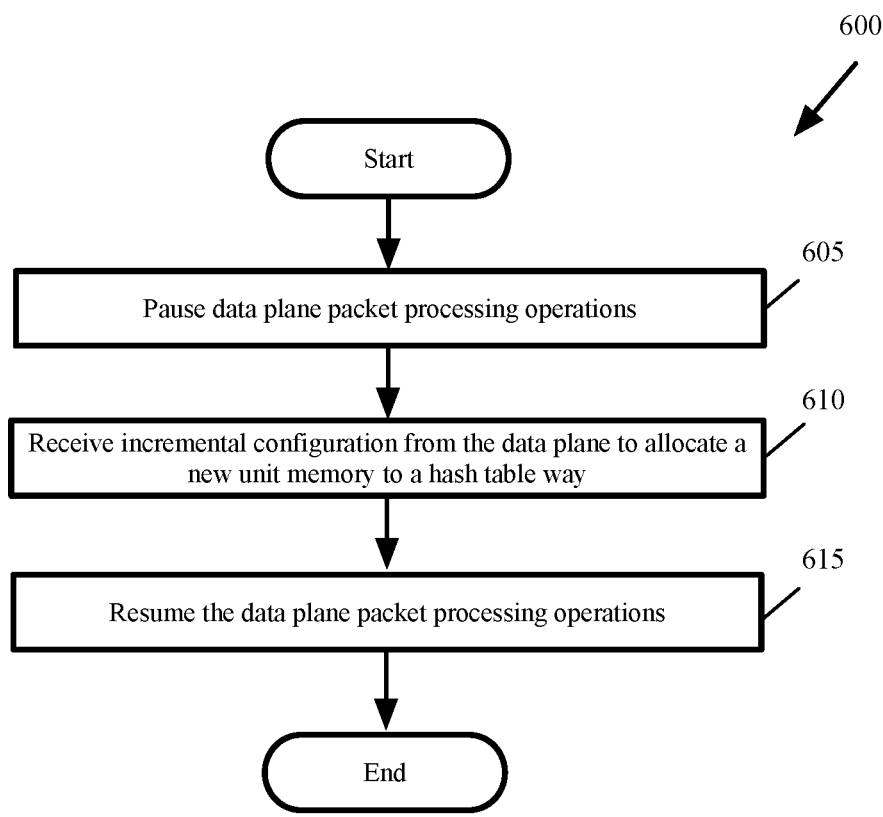
FIG. 6 conceptually illustrates a process for receiving incremental configuration by the data plane of a forwarding element configuration from the control plane to de-allocate a set of unit memories from one match table and allocate them to another unit table in some embodiments.

FIG. 6 conceptually illustrates a process 600 for receiving incremental configuration by the data plane of a forwarding element configuration from the control plane, to de-allocate a set of unit memories from one match table and allocate them to another unit table in some embodiments. As shown, the process pauses (605) data plane packet processing operations. For instance, the process pauses data plane packet processing as a result of receiving a DMA instruction that is programmed into a DMA descriptor as described above.

The process then receives (at 610) incremental configuration from the control plane to de-allocate a set of unit memories from one match table and allocate them to another unit table. For instance, the process receives incremental configuration from the control plane to de-allocate unit memory 460 from the second match table and allocate it to the first match table as descried above by reference to steps 403-404 in FIG. 4B.

The process then resumes (at 615) the data plane packet processing operations. For instance, the last DMA buffer transfer causes the data plane to resume receiving and processing the packets.

III. Using Move Registers to Update an Action Table Entries

The de-allocation of the unit memory from a match table described above is one example of the need to move entries of a unit memory from one location in the set of unit memories allocated to a match table to another location in the set of unit memories allocated to the table. Another example is the need to move entries in a match table that uses a cuckoo hash scheme.

In cuckoo hashing, a set of two or more different hash functions are used to calculate hash values for a search key. For a cuckoo hash that uses n different hash functions, n possible locations (or cells) are identified for the key. Each hash function uses a portion of the hash table's address space. Each portion (or sub-table) is referred to as a way, which is the portion of the hash table where the entries for one of the multiple hash functions are kept. For instance, when a cuckoo hashing scheme uses n hash functions, the hash table is divided into n sub-tables or ways. Each hash function stores its entries in the corresponding way during an insertion operation (where a new entry is inserted in the hash table), and provides an index into the corresponding sub-table during a search operation (when a search is made to find an entry corresponding to a search key).

Insertion of entries into a cuckoo hash table is done by calculating the hash value for a key by each of the n hash functions. When the cell identified by one of the hash function is empty, the hash value is inserted in the cell identified by that hash function in the corresponding way. When all cells identified by the n hash functions are already full, the new hash value is entered into the hash table by inserting the new hash value in one of the n possible locations and moving out the hash value that already reside in that location (similar to a cuckoo bird chick that pushes the other eggs out of a nest). This displaced hash value is then inserted in an alternative location by moving out any hash value that might reside there. These steps continue until an empty location is found to insert the last displaced hash value.

Figure 7:
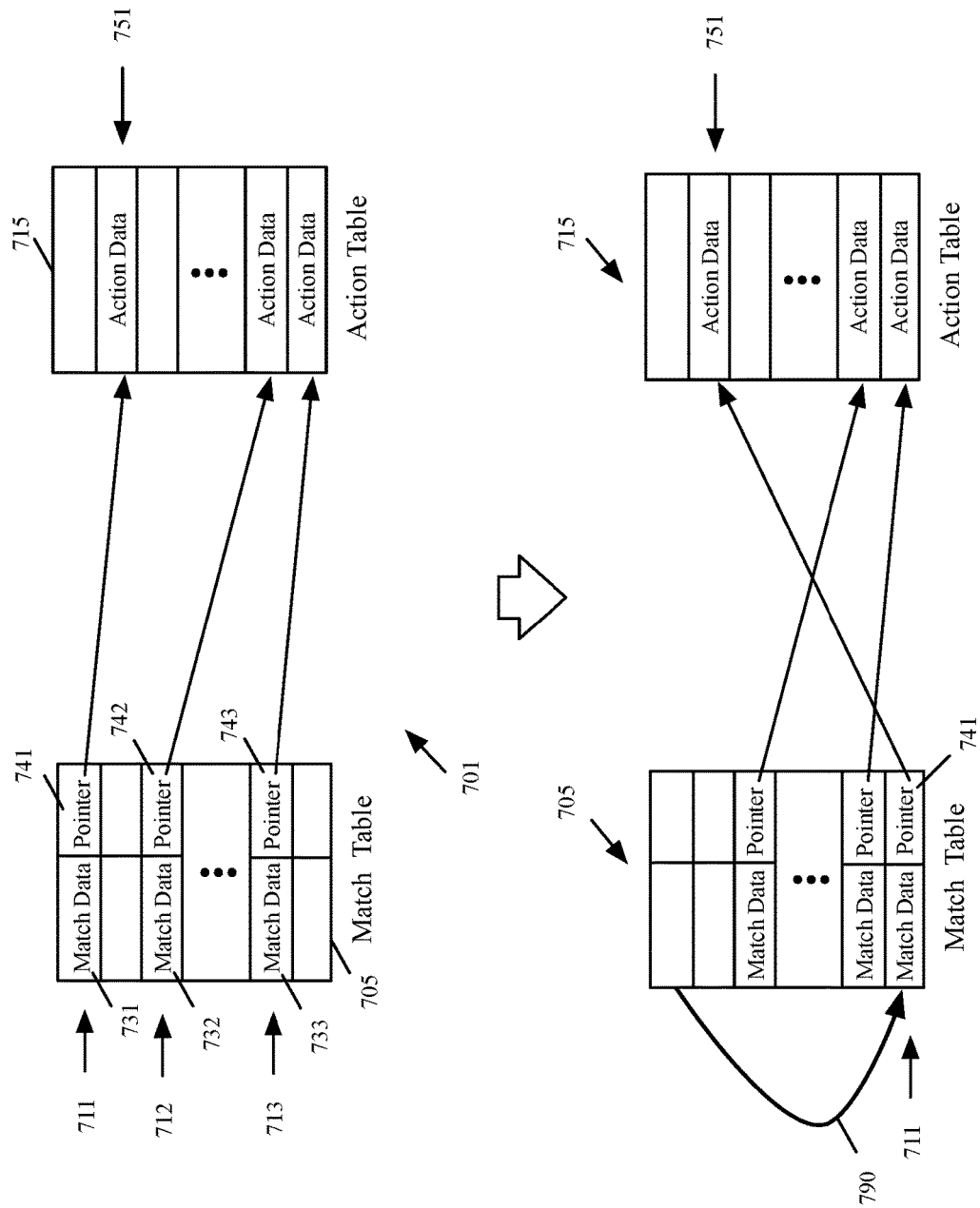
FIG. 7 conceptually illustrates a match table with entries that each specifies, within its data, the address of an entry in a corresponding table in some embodiments.

Each entry in a match table in some embodiments points to an entry in a corresponding action table. FIG. 7 conceptually illustrates a match table with entries that each specifies, within its data, the address of an entry in a corresponding table in some embodiments. In the example of FIG. 7, the corresponding table is an action table. It should be understood that a match table in some embodiments may correspond to one or more associated (or attached) tables including an action table, a meter table, a statistics table, a table with stateful data, a ternary indirection table (TIND), and/or a selector table. The following examples, therefore apply to action tables as well as other types of tables that may be associated with a match table. The figure is shown in two steps 701 and 702. As shown in step 701, the match table 705 includes several entries 711-713. Each entry's data includes match data 731-733 and a pointer 741-743 to an entry in the match table.

The match data is used to match the hash of a set of fields of an incoming packet. The pointer is used to identify an action to take when the match data matches the header fields of a packet. For instance, match table entry 711 has a pointer 741 that points to action entry 751. The action data 751 is used to perform an action on a packet that matches the match data 711.

In step 702, match table entry 711 is moved (as shown by 790) to a new location. The new location can be in the same unit memory or in another unit memory allocated to the match table 705. As shown, the pointer 741 still correctly identifies action data 751. The addressing scheme used by the match entries in FIG. 7 is referred to as an indirect addressing, where a pointer in a match entry data identifies the address of a corresponding entry in the action table. In this addressing scheme, when a match entry is moved from one location to another (e.g., as a part of the de-allocation process discussed above by reference to FIG. 5 or as a part of cuckoo hashing scheme) there is no need to adjust the action table entry corresponding to a match table entry that has been moved.

Figure 8:
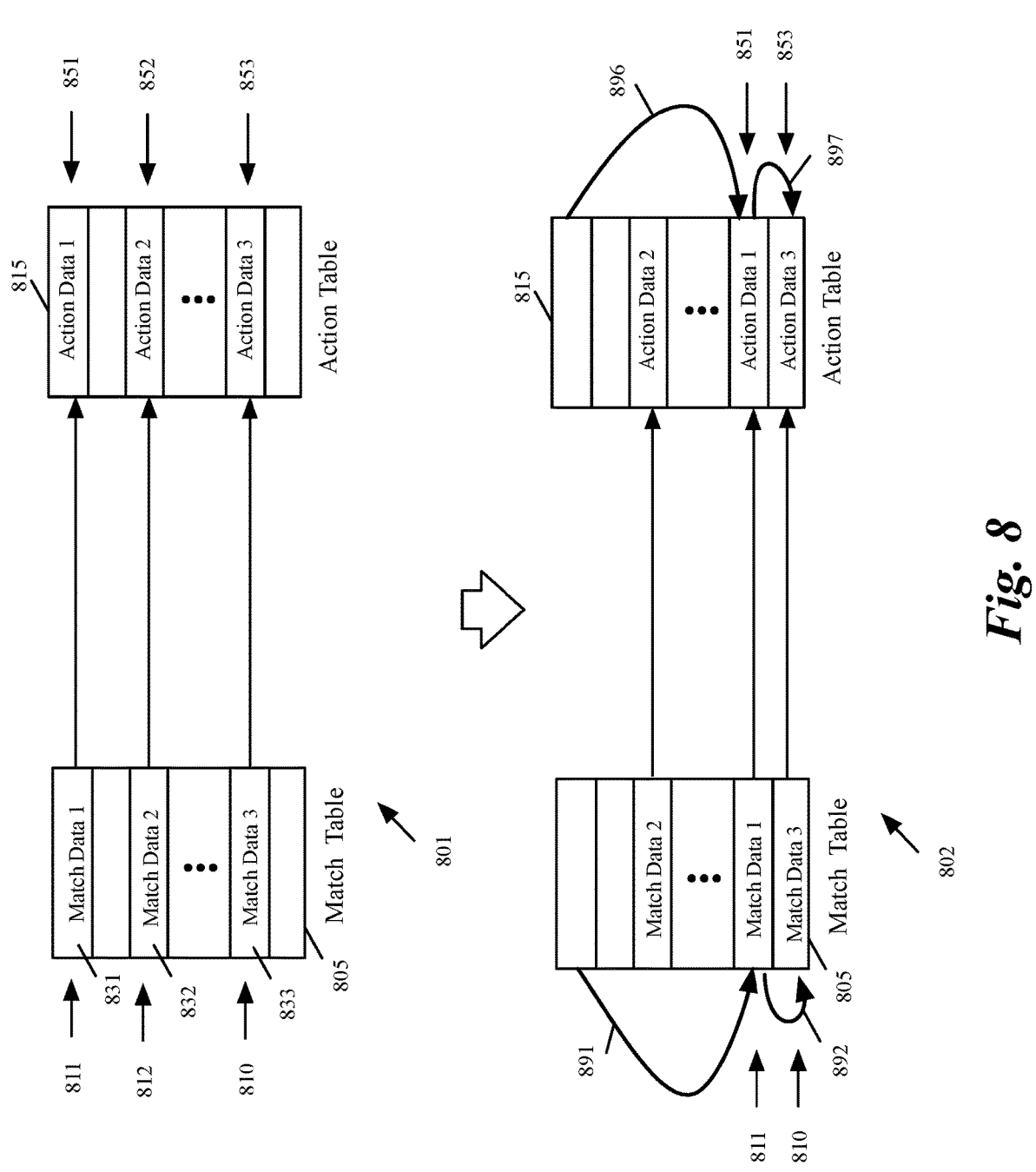
FIG. 8 conceptually illustrates a match table with entries that identify the corresponding action table entries based on a relative location of the entries in each table in some embodiments.

In other embodiments, however, the match entries do not specify the address of the corresponding action entry, but instead use a direct addressing scheme in which the address of the match entry is used for the address of the action entry. FIG. 8 conceptually illustrates a match table with entries that identify the corresponding action table entries based on a relative location of the entries in each table in some embodiments. The figure is shown in two steps 801 and 802. As shown in step 801, the match table entries 810-812 include match data 831-833 but do not include an explicit pointer such as pointers 741-743 in FIG. 7.

Instead, the match entries in the match table 805 use a direct addressing scheme to identify their corresponding entries in the action table 815. Each match entry 810-812 in the match table 805 is in the same relative position in the match table 805 as each corresponding action entry 851-853 is in the action table 815. For instance, if match entry 812 is in the $n^{th}$ position in the match table 805, the corresponding action entry 852 is also at the nth location in the action table 815.

As shown in step 802, match table entry 811 is moved (as shown by 891) to a new location. The new location can be in the same unit memory or in another unit memory allocated to the match table 805. Since the match entries in FIG. 8 use a direct addressing scheme that is based on the relative location (or the offset) of the entries in the match and action tables, the corresponding action entry 851 has to also move (as shown by 896) to the same relative location in the action table as the match entry 811.

Since the match table 805 is using a cuckoo hashing scheme, if there is already an entry residing in the location that a match entry is going to be inserted, the entry that already resides in that location has to be moved to another location first. This action has to continue until an empty location is found for the last dispatched entry.

In the example of FIG. 8, there is another entry 810 in step 801 in the location that entry 811 into which entry 811 is going to move. As shown by 892, match table entry 810 is first moved into an empty spot. As shown by 897, the corresponding action entry 853 is also moved to a location in the action table with the same offset as the target location of match entry 810. Once the locations occupied by match entry 810 and action entry 853 are emptied, match entry 811 and action entry 851 are moved into these locations, respectively.

Moving an action entry while the data plane packet processing pipeline is processing packets may result in an incorrect action to be performed on a packet. Some embodiments utilize a set of move registers to ensure that no incorrect actions can be performed while action entries are moved to their new locations.

Each action table in some embodiments uses a pair of move registers (referred to as moveregs) to move the action entries to their new locations. The move registers are configured as shift registers, with new entries shifted into the front move register and the old entries shifted to into the back move register. The front move register is referred to as the source movereg (or S) and the back register is referred to as the destination movereg (or D).

When two addresses A and B are put into the source and destination moveregs, statistics and meter operations of the pipeline use movereg statistics or meter data for any reads or writes to A or B. This begins a move operation by reading from A and putting the contents of address A into the movereg data. When A and B are shifted out of the moveregs (by, for example a new entry shifted in and A shifted to B's position), then the move from A to B is committed and the movereg data is written to B.

When the destination movereg is valid, any match to its address is disqualified. In some embodiments, each individual move operation (such as push table move address or pop table move address) generates up to four hardware operations and one software operation depending on the validity of S and D move registers and the instruction.

The five operations in some embodiments are as follows. Operation 1 inhibits matching of the new D address. Operation 2 commits the previous S->D move (writes back data move registers to the old D address). Operation 3 prepares for the next S->D by loading S into data move registers. Operation 4 prepares for the next S->D by converting any deferred RAM pointers to S to D. The first to fourth operations are performed by hardware. Operation 5, which is performed by software or firmware running on a pipeline ALU, updates the match entry of D to be the same as S (or add the new entry and its associated action data or indirect pointers). These 5 operations are further described below using an example of moving an entry into a location by evicting the current occupant of that location.

Figure 9:
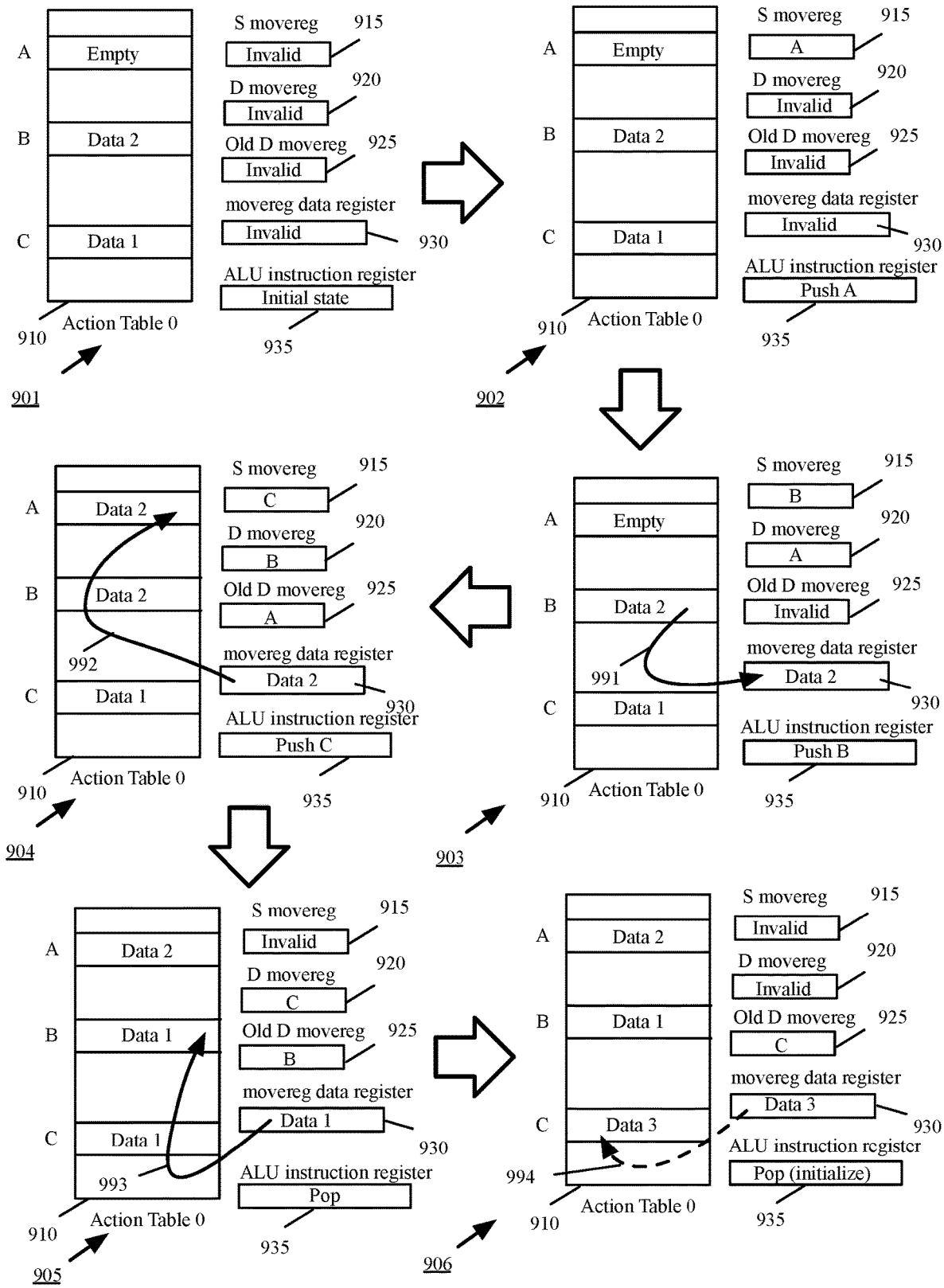
FIG. 9 conceptually illustrates how moveregs operation facilitates a table modification using an example of evict and add operations for a table in some embodiments.

FIG. 9 conceptually illustrates how moveregs operation facilitates a table modification using an example of evict and add operations for a table in some embodiments. The figure is shown in six steps 901-906. The figure shows an action table 910, an S movereg 915, a current D movereg 920, a previous D movereg 925, a movereg data register 930, and an ALU instruction register 935.

In the initial step 901, contents of the S movereg 915, the current D movereg 920, the previous D movereg 925, and the movereg data register 930 are invalid, and the instruction in the ALU instruction register 935 is "initial state". In step 902, address A is pushed into S movereg 915. In this step, the contents of the current D movereg 920, the previous D movereg 925, and the movereg data register 930 are still invalid and the instruction in the ALU instruction register 935 is "push A" indicating that the address A is pushed into the S movereg 915. In step 902 only Operation 3 described above is used to load the data for the new address S (A) into the ALUs. The unit memory word data is unmodified, which is the mechanism for the ALUs to populate their S address registers with address A.

In step 903, address B is pushed into S movereg 915 using an instruction such as push table move address. Pushing B into S movereg causes moves the previous source address of A into the D movereg 920. In this step, Operation 1 inhibits the match address A (from the D move register), which guarantees that there will be no matches generated by the hardware to address A as software loads its contents. Operation 2 is not used since the content of old movereg is still invalid.

Operation 3 loads the data for the new address S (B) into the ALUs. Once loaded with the source's data, the ALUs now match the source and destination address and use the movereg register data 930 (as shown by 991) as their source/sink, ignoring the unit memory contents (or the S/D entry contents in the unit memory word for stats/stateful ALUs with multiple entries per word). If there is deferred processing of stats or meters, Operation 4 scans the corresponding deferred unit memories for any valid entries containing the D address and converts them into S. Any deferred pointers to the address B are updated to hold the address A. As long as the move register is active (both S and D are valid), the contents read from the deferred RAM and written into the deferred RAM are also corrected for B->A. Operation 5 updates the match entry for D (A) to contain the match information for S (B). Any action data or TIND writes are also performed.

In step 904, address C is pushed into movereg's source location using an instruction such as push table move address. As a result, the previous source address of B is pushed into the destination address. Conceptually, this also moves the previous D address of A into the Old D address. In this step, Operation 1 inhibits the match address B (from the D move register), which guarantees that there will be no matches generated by the hardware to address B as software loads its contents. During the same cycle, the match address A is uninhibited. Since A was loaded with B's match entry information, it is now matching as the old B.

In this step, Operation 2 commits the B to A move. The data movereg 930 contents in each ALU are transferred back (as shown by 992) to the unit memory into the S movereg (C). As each ALU commits the data move register, it stops scanning S and D and uses unit memory contents as normal. At this point, the ALUs still see D=A and S=B. C is not shifted until Operation 3 is performed. Operation 3 then loads data for the new address S (C) into the ALUs. Once loaded with the source's data, the ALUs now match the source and destination address and use the move register data as their source/sink, ignoring the RAM contents.

If there is deferred processing of stats or meters, then Operation 4 scans the corresponding deferred unit memories for any valid entries containing the D address and converted into S. This means that any deferred pointers to the address C are updated to hold the address B. As long as the move register is active (both S and D are valid), the contents read from the deferred RAM and written into the deferred RAM are also corrected for C->B. Operation 5 then updates the match entry for D (B) to contain the match information for S (C). Any action data or TIND writes are also performed.

In step 905, the move chain has completed adding new addresses. At this point the commits and initialization have to be finished to return to the initial state where it will be ready for the next move chain. In this step, an invalid address is loaded into the S address using the instructions such as pop table move address. Since both S and D are valid, indicating a pending commit, the initialization bits are ignored.

In this step, Operation 1 inhibits the match address C (from the D move register), which guarantees that there will be no matches generated by the hardware to address C as software loads its contents. During the same cycle, the match address B is uninhibited. Since B was loaded with C's match entry information, it is now matching as the old C.

Operation 2 then commits the C to B move. The data movereg contents in each ALU are transferred back (as shown by 993) to the unit memory into the Old D address (B). As each ALU commits the data move register, it stops scanning S and D and uses RAM contents as normal. Within the ALUs the address C is moved to D and the S address is set to invalid. Operations 3 and 4 are not performed in this step, as there is no new S address. Operation 3 the updates match entry for D (C) to contain the match information for the entry to be added. Any action data or TIND writes are also performed. If meters, selectors, or stateful memories are used, they need to be configured for the new entry at this time.

Step 906 is the final step in the move chain. In this step, the stats and idle time values for the new address C are initialized and a second invalid address is pushed on to clear both D and S. This is performed using the pop table move address instruction, with its initialization bits used to choose initialization values for the entry at address C (as shown by the dashed line 994). In this step Operation 2 is performed prior to Operation 1 in order for the initialization to complete before the match entry is uninhibited. Operation 2 inhibits all match addresses. At this point, the new entry C begins matching. Operation 1 then commits the C initialization. Based on the initialization values provided to the pop instruction, statistics and idle time for address C are set to initial values. This shifts an invalid S address into the ALU. At this point, both S and D at the ALU are invalid. Operations 3 and 4 are not performed in this step as there is no new S address. Operation 5 is also not performed as all entries are already moved and set up.

IV. Computer System

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
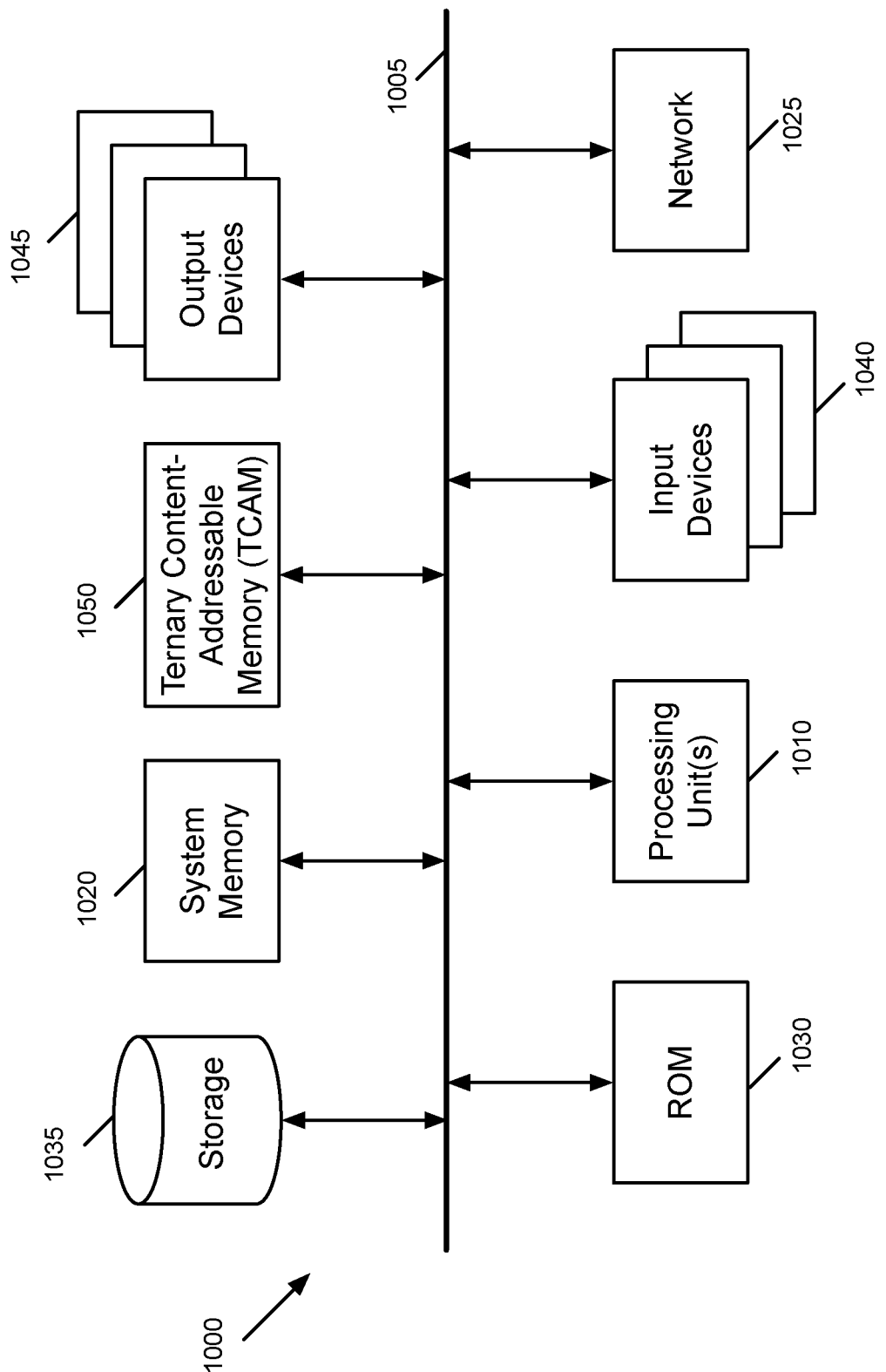
FIG. 10 conceptually illustrates an electronic system with which some embodiments of the invention are implemented.

FIG. 10 conceptually illustrates an electronic system 1000 with which some embodiments of the invention such as the forwarding elements, routers, switches, etc., are implemented. The electronic system 1000 can be used to execute any of the control, virtualization, or operating system applications described above. The electronic system 1000 may be a computer (e.g., desktop computer, personal computer, tablet computer, server computer, mainframe, blade computer etc.), phone, PDA, or any other sort of electronic device. Such an electronic system includes various types of computer readable media and interfaces for various other types of computer readable media. Electronic system 1000 includes a bus 1005, processing unit(s) 1010, system memory 1020, read-only memory (ROM) 1030, permanent storage device 1035, input devices 1040, output devices 1045, and ternary content-addressable memory (TCAM 1050).

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1020, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1020 is a read-and-write memory device. However, unlike storage device 1035, the system memory is a volatile read-and-write memory, such as random access memory. The system memory stores some of the instructions and data that the processor needs at runtime. In some embodiments, the invention's processes are stored in the system memory 1020, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices, such as a touchscreen, that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), an Intranet, or a network of networks, such as the Internet). Any or all components of electronic system 1000 may be used in conjunction with the invention.

Some embodiments include electronic components, such as microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

What is claimed is:

1. A method of sharing unit memories between at least two match tables in a data plane packet processing pipeline of a physical forwarding element, the method comprising:
   from a plurality of available unit memories of the packet processing pipeline, allocating a first set of unit memories to a first match table and a second set of unit memories to a second match table;
   determining that the first set of unit memories is filled to a threshold capacity after storing a plurality of entries in the first set of unit memories;
   de-allocating a first unit memory in the second set of unit memories from the second match table by moving contents of the first unit memory in the second set of unit memories to a second unit memory in the second set of unit memories;
   prior to de-allocating the first unit memory in the second set of unit memories from the second match table, determining that the first set of unit memories comprises less unit memories than a number of unit memories allowed for the first match table;
   allocating the first unit memory in the second set of unit memories to the first match table;
   allocating a third set of unit memories from the plurality of available unit memories of the forwarding element to the first match table; and
   de-allocating a unit memory from the first match table after a number of unit memories reaches a number of unit memories allowed for the first match table.

2. The method of claim 1, wherein a unit memory increment size is specified for the first match table, wherein allocating the third set of unit memories to the first match table comprises allocating the unit memories in the third set of unit memories to the first match table in the specified increment size.

3. The method of claim 1 further comprising: when the number of unit memories allowed for the first match table does not exceed an absolute maximum number of unit memories allowed for the first match table, incrementing the number of unit memories allowed for the first match table after allocating the first unit memory to the first match table.

4. The method of claim 1, wherein a match unit memory allocated to a match table corresponds to one or more unit memories allocated to one or more tables associated with the match table in the packet processing pipeline,
   wherein an entry in a match unit memory comprises an address of a corresponding entry in the unit memories allocated to the one or more tables associated with the match table,
   wherein moving a match entry to a new location does not require moving the entries in the unit memories allocated to the one or more tables associated with the match table,
   wherein the one or more tables associated with the match table comprise one or more of: (i) an action table, (ii) a meter table, (iii) a statistics table, (iv) a table comprising stateful data, (v) a ternary indirection table (TIND), and (vi) a selector table.

5. The method of claim 1, wherein a match unit memory allocated to a match table corresponds to one or more unit memories allocated to one or more tables associated with the match table in the packet processing pipeline,
   wherein an offset to an entry in the match unit memory is a same as an offset to a corresponding entry in the unit memory allocated to an associated table,
   wherein moving a match table entry to a new location with a particular offset in the match unit memory requires moving a corresponding unit memory entry allocated to an associated table to a location with a same offset location in an action unit memory,
   wherein the one or more tables associated with the match table comprise one or more of: (i) an action table, (ii) a meter table, (iii) a statistics table, (iv) a table comprising stateful data, (v) a ternary indirection table (TIND), and (vi) a selector table.

6. The method of claim 5, wherein the data plane packet processing pipeline comprises a plurality of move registers to move an entry in a unit memory allocated to a table associated with the match table from a first location to a second location, the move registers configured to:
- inhibit a matching operation for the entries in the first and second locations while the entry is being moved;
- using a chain of move operations to move contents of the second location to an empty location in the associated table;
- moving the contents of the first location into the second location; and
- enabling the match operation for the entry in the second unit memory.

7. The method of claim 1, wherein de-allocating the first unit memory in the second set of unit memories from the second match table and allocating the first unit memory in the second set of unit memories to the first match table comprises:
- pausing packet processing operations of the packet processing pipeline;
- receiving an incremental configuration from a control plane of the forwarding element to de-allocate the first unit memory from the second match table and allocate the first unit memory to the first match table; and
- resuming the packet processing operations of the packet processing pipeline without losing a current state of the packet processing pipeline.

8. The method of claim 7, wherein the current state of packet processing pipeline comprises contents of one or more of a set of: (i) match tables, (ii) action tables, (iii) status registers, (iv) statistics registers, (v) arithmetic logic units (ALUs), (vi) meter memories, (vii) stateful memories, (viii) ternary indirection memories, and (ix) selector memories in the data plane packet processing pipeline.

9. The method of claim 1, wherein the forwarding element is one of a network router and a network switch.

10. A physical forwarding element comprising a data plane packet processing pipeline, the data plane packet processing pipeline comprising a plurality of unit memories, the data plane packet processing pipeline configured to:
- allocate, from a plurality of available unit memories of the packet processing pipeline, a first set of unit memories to a first match table and a second set of unit memories to a second match table;
- determine that the first set of unit memories is filled to a threshold capacity after storage of a plurality of entries in the first set of unit memories;
- de-allocate a first unit memory from the second match table by a move of contents of the first unit memory to a second unit memory in the second set of unit memories;
- determine, prior to de-allocation of the first unit memory from the second match table, that the first set of unit memories comprises less unit memories than a maximum number of unit memories currently allowed for the first match table;
- allocate the first unit memory to the first match table;
- allocate a third set of unit memories from the plurality of available unit memories of the forwarding element to the first match table; and
- de-allocate a unit memory from the first match table after a number of unit memories reaches a number of unit memories allowed for the first match table.

11. The physical forwarding element of claim 10, wherein a unit memory increment size is specified for the first match table, wherein allocate the third set of unit memories to the first match table comprises allocate the third set of unit memories to the first match table in the specified increment size.

12. The physical forwarding element of claim 10, when the number of unit memories allowed for the first match table does not exceed an absolute maximum number of unit memories allowed for the first match table, the packet processing pipeline further configured to increment the maximum number of unit memories currently allowed for the first match table after allocating the first unit memory to the first match table.

13. The physical forwarding element of claim 10, wherein at least one match unit memory allocated to a match table corresponds to one or more unit memories allocated to one or more tables associated with the match table in the packet processing pipeline,
- wherein at least one entry in a match unit memory comprises an address of a corresponding entry in the unit memories allocated to the one or more tables associated with the match table, wherein a move of a match entry to a new location does not require a move of the entries in the unit memories allocated to the one or more tables associated with the match table,
- wherein the one or more tables associated with the match table comprise one or more of (i) an action table, (ii) a meter table, (iii) a statistics table, (iv) a table comprising stateful data, (v) a ternary indirection table (TIND), and (vi) a selector table.

14. The physical forwarding element of claim 10, wherein at least one match unit memory allocated to a match table corresponds to one or more unit memories allocated to one or more tables associated with the match table in the packet processing pipeline,
- wherein an offset to an entry in the match unit memory is a same as an offset to a corresponding entry in the unit memory allocated to an associated table,
- wherein a move of a match table entry to a new location with a particular offset in the match unit memory requires a move of a corresponding unit memory entry allocated to an associated table to a location with a same offset location in an action unit memory,
- wherein the one or more tables associated with the match table comprise one or more of (i) an action table, (ii) a meter table, (iii) a statistics table, (iv) a table comprising stateful data, (v) a ternary indirection table (TIND), and (vi) a selector table.

15. The physical forwarding element of claim 14, wherein the data plane packet processing pipeline comprises a plurality of move registers to move an entry in a unit memory allocated to a table associated with the match table from a first location to a second location, the move registers configured to:
- inhibit a matching operation for the entries in the first and second locations while the entry is being moved;
- use a chain of move operations to move contents of the second location to an empty location in the associated table;
- move the contents of the first location into the second location; and
- enable the match operation for the entry in the second unit memory.

16. The physical forwarding element of claim 10, wherein de-allocate the first unit memory from the second match table and allocate the first unit memory to the first match table comprises:
- pause packet processing operations of the packet processing pipeline;

receive an incremental configuration from a control plane of the forwarding element to de-allocate the first unit memory from the second match table and allocate the first unit memory to the first match table; and resume the packet processing operations of the packet processing pipeline without losing a current state of the packet processing pipeline.

17. The physical forwarding element of claim 16, wherein the state of the packet processing pipeline comprises contents of one or more of a set of: (i) match tables, (ii) action tables, (iii) status registers, (iv) statistics registers, (v) arithmetic logic units (ALUs), (vi) meter memories, (vii) stateful memories, (viii) ternary indirection memories, and (ix) selector memories in the data plane packet processing pipeline.

18. The physical forwarding element of claim 10, wherein the forwarding element is one of a network router and a network switch.

* * * * *